United States Patent [19]

Jacobsen et al.

[11] Patent Number: 4,908,896
[45] Date of Patent: Mar. 20, 1990

[54] BACKFLUSHING PRESSURE DIFFUSER SCREENS

[75] Inventors: Finn Jacobsen; Ole J. Richter, both of Karlstad, Sweden

[73] Assignee: Kamyr AB, Karlstad, Sweden

[21] Appl. No.: 233,366

[22] Filed: Aug. 18, 1988

Related U.S. Application Data

[63] Continuation-in-part of Ser. No. 125,710, Nov. 27, 1987, Pat. No. 4,793,161.

[51] Int. Cl.[4] ............................................. D21D 5/02
[52] U.S. Cl. .................................... 8/156; 68/181 R; 162/60; 162/251; 210/333.01
[58] Field of Search ................. 8/156; 68/181 R, 184, 68/190, 18 F; 162/60, 251, 252, 380; 210/333.01, 333.1, 393, 411, 159, 203, 108, 388, 389, 341

[56] References Cited

U.S. PATENT DOCUMENTS

| | | |
|---|---|---|
| 4,029,579 | 6/1977 | Jacobsen et al. .............. 68/181 R X |
| 4,041,560 | 8/1977 | Jacobsen ................................. 8/156 |
| 4,172,037 | 10/1979 | Golston . |
| 4,368,628 | 1/1983 | Jacobsen .......................... 68/181 R |
| 4,396,509 | 8/1983 | Foyn . |
| 4,535,497 | 8/1985 | Jacobsen ................................. 8/156 |
| 4,793,161 | 12/1988 | Richter et al. . |

FOREIGN PATENT DOCUMENTS 2159725  2/1985  United Kingdom .

Primary Examiner—Philip R. Coe
Assistant Examiner—Stephen F. Gerrity
Attorney, Agent, or Firm—Nixon & Vanderhye

[57] ABSTRACT

A pressure diffuser includes in a liquid-tight pressurized vessel a vertical screen and which screen and vessel wall define first and second interior volumes for transmitting pulp from a pulp inlet to a pulp outlet and receiving displacement (e.g. wash or bleach) liquid transmitted from headers through the pulp. The screen ends have different cross-sectional areas, and quick movement of the screen effects backflushing. The volumes are segregated by a vertical, generally cylindrical, screen. A chamber is provided in communication on opposite sides of a piston therein with the pulp adjacent the pulp inlet and the extracted liquid. By displacing the piston immediately prior to rapidly moving the screen vertically to effect backflushing through the screen, the pulp pressure on the screen is being reduced and at the same time a volume is made available adjacent the pulp inlet in the chamber thus avoiding pressure shocks and compaction of the pulp adjacent the inlet caused by the movement of the screen.

14 Claims, 3 Drawing Sheets

BACKFLUSHING PRESSURE DIFFUSER SCREENS

RELATED APPLICATIONS

This application is a continuation-in-part of application Ser. No. 07/125,710 filed Nov. 27, 1987 for Effective Diffuser/Thickener Screen Backflushing, now U.S. Pat. No. 4,793,161.

FIELD OF THE INVENTION

The present invention relates to paper pulp treatment operations and particularly to a pressure diffuser for washing pulp wherein a screen is used to separate the extracted liquid from the pulp after washing.

BACKGROUND OF THE INVENTION

Generally, a pressure diffuser useful in the paper pulp industry comprises an elongated generally vertically upstanding vessel which mounts an elongated annular screen for vertical movement within the vessel. Pulp under pressure flows into one end of the vessel and into the annular space between the screen and the exterior vessel wall and through an outlet adjacent the other end of the vessel. As the pressurized pulp traverses the height of the vessel, displacement liquid is introduced into the annular chamber by a plurality of vertically spaced header assemblies. The displacement liquid flows generally radially inwardly through the pulp, treating the pulp, and through the screen into the interior of the vessel furnished with a liquid outlet. The screen is moved concurrently with the pulp a limited distance of travel and is then returned quickly to clean the screen by a combined wiping and backflushing action. The different diameters of the upper and lower ends of the screen create filtrate compression and thus backflushing (e.g. see U.S. Pat. No. 4,396,509), during screen movement thus forcing the liquid through the screen holes to backflush the screen.

While such pressure diffusers have been used successfully, a drawback of this type of flushing action is the pressure shock generated in the pulp by the backflushing action. For example, the quick motion of the screen tends to suddenly compress the pulp adjacent the pulp inlet. This has a deleterious effect on the process.

SUMMARY OF THE INVENTION

According to the present invention, the above-identified drawback is overcome and a simple yet effective method and apparatus for backflush improvement is provided. Particularly, the present invention provides, in a preferred embodiment, a vertically extending and movable screen disposed within the vessel and preferably defined by a surface of revolution about its vertical axis, for example, a screen of generally conical configuration having a vertical axis. A plurality of vertically spaced headers are disposed about the outside of the vessel for delivering displacement liquid through the vessel wall into the annular space between the wall and the screen. Pulp is disposed in the annular space preferably from an inlet adjacent one end of the vessel for flow into an outlet adjacent the other end of the vessel. The displacement liquid supplied by the headers flows generally radially inwardly through the pulp in the annular space and through the screen into the central portion of the vessel which is provided with an extraction liquor outlet. As previously described, the screen is mounted for vertical movement in the direction of pulp flow, in this case downwardly, to facilitate extraction of the liquid from the pulp through the screen into the central portion of the vessel. Rapid movement of the screen in the opposite direction, i.e. upwardly, causes the liquid in the vessel to backflush the screen.

To avoid pressure shocks in and compaction of the pulp, particularly adjacent the inlet during backflushing, a chamber defining element is disposed adjacent the pulp inlet of the vessel. The piston rod which mounts the screen for vertical movement passes through the element. The chamber defining element carries an annular piston moveable the length of the chamber and preferably independently of the screen moving rod, by an externally operated hydraulic cylinder. On one side of the piston within the chamber, the corresponding end of the chamber is open to the pulp flowing into the vessel and into the annular passage between the vessel wall and the screen. The opposite side of the piston opening toward the opposite end of the chamber is in open communication with the liquid within the screen.

In accordance with the present invention, just prior to backflushing the screen by rapidly moving the screen in a direction opposite to the direction of pulp flow, the piston in the chamber is actuated to displace liquid from the chamber. This provides a limited compression of the liquid within the screen and hence a limited backflushing effect through the screen. Importantly, it correspondingly provides an evacuated volume on the opposite side of the piston, i.e., the pulp side. Consequently, a larger volume is available for the pulp adjacent the pulp inlet to the vessel such that the rapid movement of the screen in a direction opposite the pulp flow, for purposes of backflushing the screen, avoids the formation of pressure shocks and pulp compaction in the area of the pulp inlet.

In another embodiment of the present invention, the screen is disposed between the outer vessel wall and an interior chamber wall to define first and second annular spaces on opposite sides of the screen. In this form, pulp flows through an inlet adjacent the top of the vessel into the innermost annular volume and displacement liquid is introduced from the inner chamber for flow radially outwardly through the pulp and through the screen into the outer annular chamber. That is to say, headers for providing displacement liquid are disposed within the vessel for flowing displacement liquid radially outwardly through the pulp screen and into the outermost annular chamber where outlets are provided for removing the displaced liquid. In this form, to backflush the screen, a similar piston and cylinder arrangement is provided adjacent the top of the vessel with the chamber defining element opening on one side of the piston to the pulp and at its opposite side to the wash liquid through a conduit connecting the upper end of the chamber to the outermost annular chamber. As in the prior embodiment, just prior to effecting rapid movement of the screen in a direction opposite the pulp flow to backflush, the piston is displaced in a direction forcing extraction liquid into the outermost annular chamber, thereby reducing friction between the pulp bed and the screen, while simultaneously the piston evacuates a volume in the chamber adjacent the top of the vessel. Consequently, a pressure shock in and compaction of the pulp adjacent the pulp inlet is avoided partly by the reduced friction between pulp and screen and partly by the increase in volume afforded by the movement of the piston.

In accordance with a preferred embodiment of the present invention, there is provided a pulp treating apparatus comprising a generally upright vessel defining a first interior volume for containing pulp to be treated. The vessel has a pulp inlet and a pulp outlet, the pulp flowing generally vertically between the pulp inlet and the pulp outlet. A screen defining a surface of revolution upstands within the vessel and defines, in part, the interior volume containing the pulp. Extraction means for withdrawing liquid from the pulp and through said screen is provided and includes means defining a second interior volume within the vessel for receiving the extracted liquid. Screen backflushing means are mounted within the vessel and include a chamber defining element having first and second ends, the first end lying in communication with liquid in the second interior volume, and the second end lying in open communication with the pulp within the first interior volume of the vessel. The backflushing means further includes a piston mounted within the chamber defining element for reciprocal movement therein and means for moving the piston in the chamber defining element towards the first end to cause the piston to force liquid out of the chamber and to provide an increase volume for the pulp in the first interior volume.

In accordance with another preferred embodiment of the present invention, there is provided a method of backflushing a screen in a pulp treatment apparatus having a screen defining in part a first interior volume for receiving pulp and in part a second interior volume for receiving liquid, and utilizing a generally upright vessel having a pulp inlet and a pulp outlet with the screen extending generally vertically in the vessel, the method comprising the steps of, (a) passing pulp generally vertically in the vessel from the inlet to the outlet, (b) effecting substantially continuous extraction of liquid from the pulp in the first interior volume through the screen for flow into the second interior volume, (c) backflushing the screen by causing liquid to flow from the second interior volume through said screen into the first interior volume mainly by volumetric reaction in a confined extraction chamber, and (d) effecting substantially simultaneously a decrease in the volume of the second interior volume and an increase in the volume of the first interior volume to substantially avoid pressure shock and compaction of the pulp when the screen is backflushed.

The invention differs from conventional ring-type diffusers in which all the backflush is provided by external means. Here, the main backflush is provided by movement of the screen.

Accordingly, it is a primary object of the present invention to provide novel and improved apparatus and methods for backflushing the screen in a pressure diffuser in a manner to avoid pressure shocks in and compaction of pulp.

These and further objects and advantages of the present invention will become more apparent upon reference to the following specification, drawings and claims.

DETAILED DESCRIPTION OF THE DRAWINGS

Reference will now be made in detail to the present preferred embodiment of the invention, an example of which is illustrated in the accompanying drawing figures.

Figure 1:
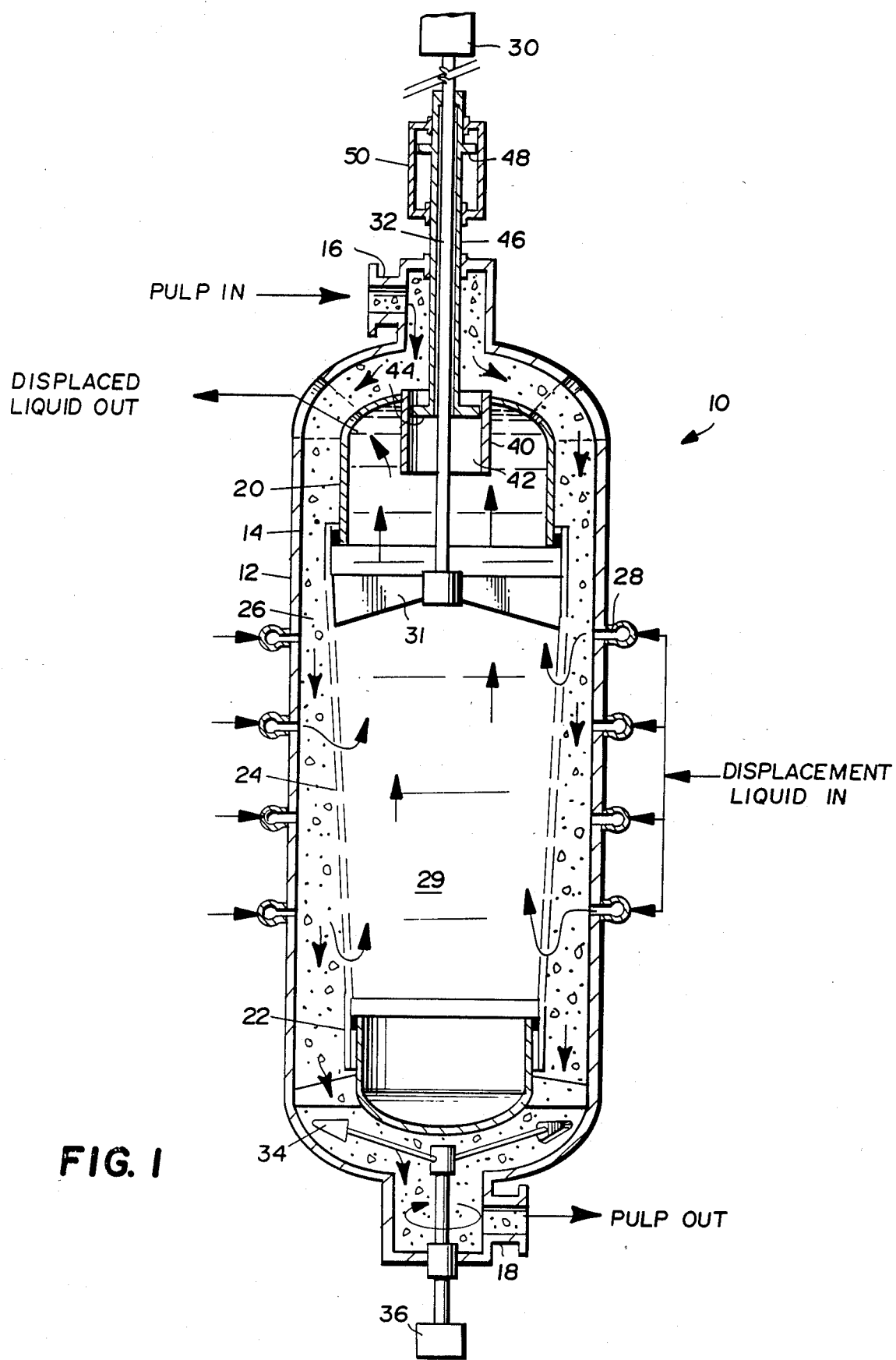
FIG. 1 is a vertical cross-sectional view through the center line of a pressure diffuser constructed in accordance with the present invention.

Referring now to the drawing figures, particularly to FIG. 1, there is illustrated a pressure diffuser, generally designated 10, constructed in accordance with the present invention and comprised of a generally vertically upstanding vessel 12 having an outer wall 14. Vessel 12 is closed except for a pulp inlet 16 adjacent a top portion of the vessel and a pulp outlet 18 adjacent a bottom portion of the vessel. Fixed within the upper and lower portions of the vessel and spaced inwardly of the vessel wall 14 are upper and lower housing members 20 and 22, respectively. Each housing member 20 and 22 is generally cup shaped, the upper member 20 being inverted. Members 20 and 22 are also spaced axially one from the other.

An elongated annular screen 24 extends between the lower margin of upper member 20 and the upper margin of the lower member 20. The screen 24 is generally slightly conical in shape and tapers radially inwardly in a downward direction. Thus, as illustrated in FIG. 1, pulp enters the vessel through the pulp inlet 16 and passes downwardly through a first annular interior volume 26 defined between the outer vessel wall 14 and the walls of members 20 and 22 as well as screen 24 for flow out of the vessel through pulp outlet 18.

A plurality of headers 28 each having an inlet are disposed about the exterior of the vessel wall 14 for flowing displacement (e.g. wash or bleach) liquid into the interior volume 26 traversed by the pulp. Thus, liquid is introduced at vertically spaced positions in the vessel wall 14 and substantially circumferentially about the interior volume 26 at each vertical location whereby the displacement liquid passes generally radially inwardly through the pulp and through screen 24 for collection within the second interior volume 29 within screen 24 and members 20 and 22.

The screen 24 is reciprocal in a generally vertical axial direction, preferably by means of a hydraulic cylinder 30. Cylinder 30 has a piston rod 32 which extends downwardly into the top portion of the vessel terminating in a spider 31 coupled to the screen 24. Consequently, by actuation of cylinder 30, piston rod 32 displaces the screen in a vertically upward or downward direction as desired. It will be appreciated that in normal operation, the screen moves downwardly in the direction of the flow of pulp and then is rapidly moved upwardly to effect backflushing of the screen in a manner set forth in the ensuing description. The different diameters of the upper and lower ends of screen 24 results — upon movement of screen 24 — in the creation of suction and backflushing. The main backflush is created by the movement of the screen 24.

At the bottom of the vessel, there is provided a rotary scraper 34 driven by a motor 36 exterior of the vessel 12. Consequently, scraper 34 facilitates flow of pulp from the interior volume 26 through outlet 18.

In accordance with the present invention there is provided a generally cylindrical element 40 which defines a chamber 42, located adjacent the pulp inlet.

Disposed within chamber 42 is an annular piston 44. Piston 44 is movable in opposite directions within the chamber defining element 40 by a piston rod 46 comprised of a sleeve which surrounds the piston rod 32. Sleeve 46 terminates at its upper end in an annular piston 48 disposed in a cylinder 50. The sleeve 46 and cylinder 50 surround the piston rod 32. Consequently, it will be seen that the cylinders 30 and 50 may be actuated independently one from the other and that the displacement of the piston 44 in chamber defining element 40 and the screen 24 may be effected independently of one another.

In operation, it will be appreciated that pulp is provided through inlet 16 and into the interior volume 26 comprising the annular chamber between the vessel wall 14 and screen 24 and flows outwardly from the vessel 12 through outlet 18. Displacement liquid is introduced through the headers 28 and passes generally radially inwardly through the pulp and then through the screen where displaced liquid is separated from the pulp and collected in the second interior volume 29 within the vessel. Spent displacement liquid is removed from the interior volume 29 by an outlet conduit (not shown). Generally, screen 24 is displaced in the direction of pulp flow and at a similar speed. This is accomplished by actuating cylinder 30 for example to extend rod 32 into vessel 12 to displace the screen 24 downwardly with the pulp.

To backflush the screen 24, cylinder 50 is actuated just prior to the rapid reversal of cylinder 30 and hence just prior to the rapid upward movement of screen 24. That is, upon actuation of cylinder 50, piston 48 and rod 46 extend downwardly to displace corresponding equal volumes on opposite sides of piston 44 in chamber defining element 40. Consequently, the volume of liquid below piston 44 is displaced into interior volume 29 while the opposite side of piston 44 evacuates the chamber enabling pulp flow into the chamber. Just prior to the backflushing by rapid movement of the screen 24 in an upward direction in FIG. 1, piston 44 starts to move downwardly. The screen movement creates suction and causes the majority of the backflushing action.

To provide further backflush, cylinder 30 comprises additional backflushing means. Cylinder 30 is actuated to rapidly move screen 24 in a direction opposite the direction of pulp flow causing a rapid pressure buildup within interior volume 29 and hence passage of the spent liquid through screen 24 in a reverse direction cleaning the screen. Simultaneously, piston 44 is displaced further in the chamber defining element 40 creating a volume in chamber 40 for receiving the pulp. Consequently, any back pressure or pressure shock occurring in the pulp as a result of the rapid upward movement of the screen 24 during backflushing is dissipated by entry of the pulp into the evacuated portion of the chamber on the opposite side of the piston 44.

Figure 2:
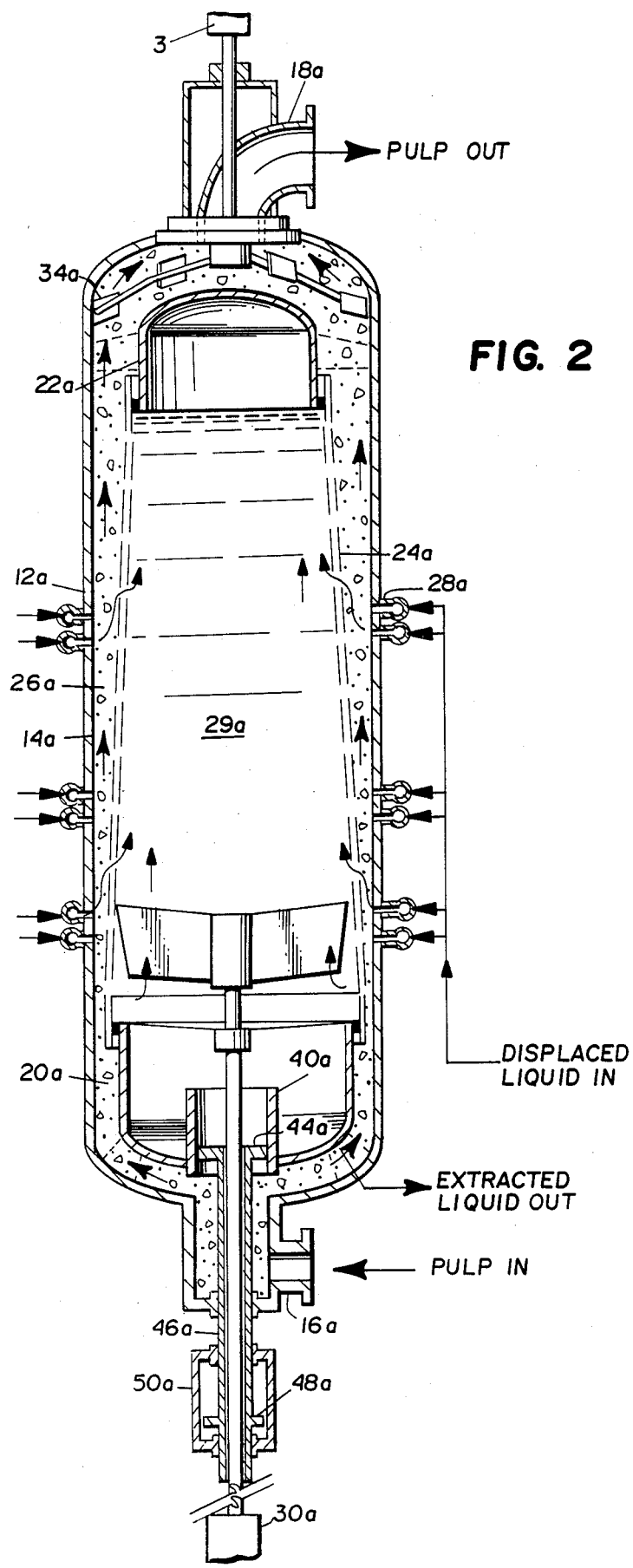
FIG. 2 is a view similar to FIG. 1 illustrating a further form of pressure diffuser according to the present invention.

Referring now to FIG. 2, wherein like reference numerals to refer to like parts succeeded by the suffix "a", there is illustrated a pressure diffuser vessel 12a having a vessel wall 14a, a pulp inlet 16a adjacent the bottom of the vessel, and a pulp outlet 18a adjacent the top of the vessel. In this form, pulp flows into the vessel from the bottom via pulp inlet 16a and upwardly in an annular interior volume 26a defined between vessel wall 12 and a screen 24a. The pulp exits the vessel via outlet 18a with the assist of a scraper 34a under control of a motor.

The vertically extending conical screen 24a extends between cup shaped members 20a and 22a and a wash liquor outlet, not shown, lies in communication with the interior of screen 24a. The lower end of member 20a also defines a cylindrical chamber 40a carrying a piston 44a. The chamber 40a is open on its opposite sides to the liquid within the interior volume 29a within screen 24a and on its opposite side with the pulp adjacent the inlet 16a. As in the previous embodiment, piston 44a is displaced by a sleeve 46a actuated by a cylinder 50a having a piston 48a.

Also, as in the previous embodiment, pulp flows through the inlet 16a into the annular space defined by the interior volume 26a and into which space displacement liquid is introduced through headers 28a passes radially inwardly and displaces liquid for passage through the screen 24a into interior volume 29a. The treated pulp exits pulp outlet 18a. To backflush screen 24a, and just prior to rapidly moving the screen opposite the direction of flow of the pulp, cylinder 50a is actuated to displace piston 44a causing diminishment of the volume of the liquid in chamber 28a (and consequent limited backflushing) and an enlargement of the volume adjacent the pulp inlet 16a for receiving the pulp. Subsequent to initiation of piston 50a, cylinder 30a is actuated to rapidly move the screen in this case in an upward direction to cause backflushing. The initiation of the movement of piston 44a prior to movement of the screen followed by simultaneous movement of piston 44a with movement of the screen reduces, as in the previous embodiment, the shock effect of the backflushing and any compaction of the pulp adjacent the pulp inlet.

Figure 3:
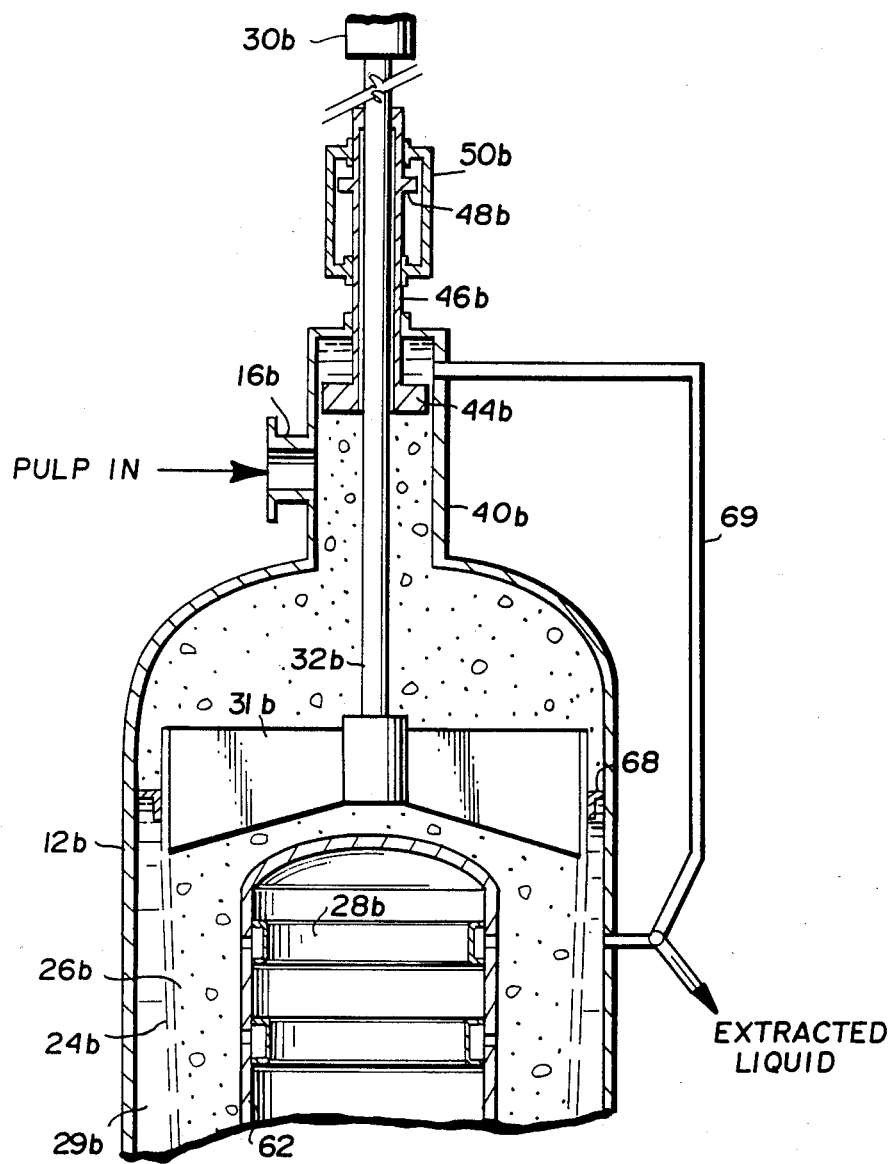
FIG. 3 is a fragmentary enlarged cross-sectional view of a third embodiment of the present invention and taken through the center line of the pressure diffuser.

Referring now to FIG. 3, there is illustrated a still further embodiment of the present invention wherein like reference numerals are applied to like parts followed by the suffix "b". In this form, pulp flows through the pulp inlet 16b for flow downwardly through an interior volume defined radially outwardly of a screen 24b and radially inwardly of an internal cylindrical shell 62. The upper end of the screen 24b is supported by a spider 31b in turn supported by a shaft 32b coupled to a piston and cylinder arrangement 30b. In this manner, the screen 24b may be displaced vertically in the direction of the flow of the pulp, in this case, downwardly of vessel 12b. A plurality of headers 28b are provided along the inside wall of interior shell 62 for providing displacement liquid at vertically spaced positions along the shell for flow generally radially outwardly through the pulp in the annulus defining the interior volume 26b. The displaced liquid then flows generally radially outwardly through the screen 24b into the annular chamber 29b defined between the screen 24b and vessel wall 12b. An annular seal and bearing 68 is provided between the vessel wall 12b and a cylindrical ring about the spider 31b preventing egress of pulp into the annular space 29b. In this form, the pulp enters the vessel through inlet 16b and flows downwardly into the interior volume 26b between screen 24b and shell 62 where the displacement liquid is added from headers 28b. The pulp then flows to an outlet adjacent the bottom of the tank. It will be appreciated that the screen 24b moves slower in the direction of pulp flow and rapidly in the opposite direction by actuation of cylinder 30b.

In this form, the upper end of vessel 12b has a cylindrical projection forming part of the pulp inlet 16a. Within this cylindrical defining element 40b is disposed piston 44b carried by a piston rod or sleeve 46b carrying at its upper end a piston 48b disposed in cylinder 50b.

In operation, to backflush the screen 24b, cylinder 50b is initially actuated to raise piston 44b thereby evacuating a portion of the chamber defining element 40b while forcing liquid into the interior chamber 29b via pipeline 69 resulting in an initial slight backflushing of the screen. More importantly, the volume of the chamber 40b below the piston increases correspondingly to the decrease in volume of the liquid chamber above piston 44b. Thus, when piston 30b is actuated to rapidly move the screen 24b in a vertical direction opposite the pulp flow to backflush the screen, the continued and simultaneous evacuation of the lower portion of chamber 40b by the displacement of piston 44b provides additional space for the pulp. This eliminates or minimizes any pressure shock and compaction of the pulp adjacent the inlet.

In all the embodiments, the slurry will be under pressure — that is a pressure significantly greater than one atmosphere. It will be under pressure the entire time it is in the vessel 10, from the time it enters the inlet until when it leaves the outlet.

It will be appreciated that the above described invention may be used for washing pulp, for thickening, or for bleaching operations, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of backflushing a screen in a pulp treatment apparatus having a screen having different end cross-sectional areas and defining in part a first, pressurized interior volume for receiving pulp and in part a second interior volume for receiving liquid, and utilizing a generally upright, liquid-tight pressurized vessel having a pulp inlet and a pulp outlet with the screen extending generally vertically in said vessel, the pulp comprising comminuted material in a liquid slurry, said method comprising the steps of:
   (a) passing pulp under pressure generally vertically in the vessel from the inlet to the outlet;
   (b) effecting substantially continuous extraction of liquid from the pulp in said first interior volume through the screen for flow into said second interior volume;
   (c) backflushing said screen by moving the screen quickly to cause liquid to flow from said second interior volume through said screen into said first interior volume; and
   (d) in addition to the backflushing provided by step (c), effecting substantially simultaneously a decrease in the volume of said second interior volume adjacent the pulp inlet and an increase in the volume of said first interior volume adjacent the pulp inlet to substantially avoid pressure shock and compaction of the pulp when said screen is backflushed.

2. A method according to claim 1 wherein step (c) comprises effecting vertically movement of the screen in the direction of pulp flow at a first speed, and in the direction opposite pulp flow at a second speed much higher than the first speed, and wherein step (d) is initiated prior to step (c).

3. A method according to claim 1 wherein step (d) includes decreasing the volume of the second interior volume and correspondingly increasing the volume of the first interior volume.

4. A method according to claim 1 wherein the screen is disposed radially inwardly of said first interior volume and radially outwardly of said second interior volume and wherein steps (b) and (c) are effected by flowing liquid radially inwardly and outwardly relative to the screen, respectively.

5. A method according to claim 1 wherein step (d) is accomplished by displacing a piston in a cylinder opening at opposite ends thereof into said first and second interior volumes, respectively.

6. A method according to claim 1 wherein steps (b) and (c) are performed substantially simultaneously.

7. A method according to claim 1 wherein step (d) is accomplished by displacing a single piston in a corresponding single cylinder open at opposite ends thereof into said first and second interior volumes and wherein steps (b) and (c) are performed substantially simultaneously.

8. A method according to claim 1 wherein step (d) is initiated prior to step (c) and steps (c) and (d) are thereafter performed simultaneously.

9. A method as recited in claim 1 comprising the further step of continuously adding treatment liquid to the vessel first interior volume to treat the pulp, and pass through the pulp toward the second interior volume.

10. A method according to claim 9 wherein said first interior volume is disposed radially inwardly of said screen and said second interior volume is disposed radially outwardly of said screen and wherein the steps (b) and (c) effect flow of liquid through said screen in radial outward and inward directions, respectively.

11. A method claim according to claim 9 wherein the treatment liquid is a wash liquid and includes the further step of introducing the wash liquid into the pulp to wash the pulp.

12. A method according to claim 9 wherein the treatment liquid is a bleaching liquid and including the further step of introducing the bleaching liquid into the pulp to bleach the pulp.

13. A method of backflushing a screen in a pulp treatment apparatus having a screen defining in part a first, pressurized interior volume for receiving pulp and in part a second interior volume for receiving liquid, and utilizing a generally upright, liquid-tight pressurized vessel having a pulp inlet and a pulp outlet with the screen extending generally vertically in said vessel, the pulp comprising comminuted material in a liquid slurry, said method comprising the steps of:
   (a) passing pulp under pressure generally vertically in the vessel from the inlet to the outlet;
   (b) effecting substantially continuous extraction of liquid from the pulp in said first interior volume through the screen for flow into said second interior volume;
   (c) backflushing said screen by moving the screen quickly to cause liquid to flow from said second interior volume through said screen into said first interior volume; and
   (d) effecting substantially simultaneously a decrease in the volume of said second interior volume and an increase in the volume of said first interior volume to substantially avoid pressure shock and compaction of the pulp when said screen is backflushed; and wherein step (d) is initiated prior to step (c), and steps (c) and (d) are thereafter performed simultaneously.

14. A method according to claim 13 wherein step (d) includes decreasing the volume of the second interior volume and increasing the volume of the first interior volume by a magnitude corresponding to the decrease in volume of said second interior volume.

* * * * *